(12) United States Patent
Spaulding et al.

(10) Patent No.: US 8,911,080 B2
(45) Date of Patent: Dec. 16, 2014

(54) USAGE COMPLIANCE INDICATOR FOR CONTACT LENSES

(75) Inventors: Russell T. Spaulding, St. Johns, FL (US); Nelson V. Tabirian, Winter Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 103 days.

(21) Appl. No.: 13/594,976

(22) Filed: Aug. 27, 2012

(65) Prior Publication Data

US 2014/0055740 A1 Feb. 27, 2014

(51) Int. Cl.
*G02C 7/04* (2006.01)

(52) U.S. Cl.
CPC .................................. *G02C 7/04* (2013.01)
USPC .................................................... 351/159.28

(58) Field of Classification Search
CPC .......... G02C 7/021; G02C 7/04; G02C 7/046; G02C 7/049; B24B 13/0055
USPC ........................................ 351/159.24–159.32
See application file for complete search history.

(56) References Cited

U.S. PATENT DOCUMENTS

| 7,802,883 | B2* | 9/2010 | Wright et al. ............. 351/159.31 |
| 2008/0129960 | A1 | 6/2008 | Heacock et al. | |
| 2012/0069254 | A1 | 3/2012 | Burton | |
| 2012/0162599 | A1* | 6/2012 | Enerson .................... 351/159.02 |

FOREIGN PATENT DOCUMENTS

| EP | S63163321 A | 7/1988 |
| WO | WO 2006/063836 A1 | 6/2006 |
| WO | WO 2011/162958 A2 | 12/2011 |

OTHER PUBLICATIONS

European Search Report for Application No. EP13181900 dated Oct. 28, 2013.

\* cited by examiner

*Primary Examiner* — Darryl J Collins
(74) *Attorney, Agent, or Firm* — Carl J. Evens (57) ABSTRACT

An ophthalmic lens incorporating a usage compliance indicator may be utilized to indicate when the lens should be discarded or otherwise treated. The usage compliance indicator comprises a material that is clear when the lens is removed from its packaging and transforms to a visible marking over a given period of time corresponding to the manufacturer's suggested usable time. The material is compatible with the lens material and does not interfere with the optics.

11 Claims, 9 Drawing Sheets

USAGE COMPLIANCE INDICATOR FOR CONTACT LENSES

BACKGROUND OF THE INVENTION

1. Field of the Invention

The present invention relates to ophthalmic lenses, and more particularly to contact lenses incorporating a compliance indicator comprising a material that when exposed to visible light causes the material to change from transparent to visible over a predetermined period of time, thereby functioning as an alert to the user to replace the contact lenses.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia. Astigmatism is an optical or refractive defect in which an individual's vision is blurred due to the inability of the eye to focus a point object into a focused image on the retina. Astigmatism is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Contact lenses may be broadly categorized as daily disposable contact lenses, frequent replacement contact lenses and traditional contact lenses. Daily disposable contact lenses, as the name implies, are worn for a single day and discarded. Cleaning solutions are not typically utilized with these lenses. Frequent replacement contact lenses include lenses that may be reused for two weeks up to one month depending on the manufacturer's and/or the doctor's recommendation and generally require cleaning and disinfection every day. There are even contact lenses that are approved for longer periods of reuse. Frequent replacement lenses also include extended wear contact lenses which may be kept on eye for up to a week. Traditional contact lenses or reusable contact lenses are worn for much longer periods and are typically discarded approximately every six months.

Contact lens manufacturers as well as eye doctors recommend a certain replacement time (excluding daily disposable) for the different types of contact lenses for a number of reasons. For example, regardless of how well the contact lenses are cleaned and cared for, over time all contact lenses will get a buildup of protein, calcium and lipid deposits. These deposits may make the contact lenses less comfortable to wear and potentially make the eyes more prone to infection and irritation. Therefore, individuals need to keep track of the time the lenses are worn in order to be in compliance with recommendations.

Currently, there are no contact lenses with visible indicators to provide a patient, or in the case of pediatric use, to provide a parent with a clear signal that a contact lens has been used past its approved or recommended wear schedule. Accordingly, there exists a need for safety, health and/or other reasons, to develop a technology that would prevent wearing contact lenses beyond time periods designated for their replacement.

SUMMARY OF THE INVENTION

The usage compliance indicator for contact lenses in accordance with the present invention overcomes the disadvantages associated with the prior art as briefly set forth above.

In accordance with one exemplary embodiment, the present invention is directed to an ophthalmic lens. The ophthalmic lens comprises a contact lens formed from a first material and having at least an optic zone and a peripheral zone, the contact lens having a useful life period, and a usage compliance indicator embedded in the contact lens, the usage compliance indicator comprising a material that is changeable between an invisible state and a visible state over a predetermined period of time when subjected to an external stimulus, the predetermined period of time being defined by the useful life period of the contact lens.

In accordance with another exemplary embodiment, the present invention is directed to a lens comprising a first material and having a useful life period and a usage compliance indicator embedded in the lens, the usage compliance indicator comprising a material that is changeable between an invisible state and a visible state over a predetermined period of time when subjected to an external stimulus, the predetermined period of time being defined by the useful life period of the lens.

In accordance with yet another exemplary embodiment, the present invention is directed to an ophthalmic lens. The ophthalmic lens comprises a contact lens formed from a first material and including at least an optic zone and a peripheral zone, the contact lens having a useful life period, and an inversion marking incorporated into the contact lens, the inversion marking comprising a second material configured to be visible when off the eye and invisible when on the eye, and a compliance indicator, the compliance indicator including a material that is changeable between an invisible state and a visible state over a predetermined period of time when subjected to an external stimulus, the predetermined period of time being defined by the useful life period of the contact lens.

The present invention is directed to a usage compliance indicator for contact lenses that alerts the user of such lenses that the period of time for which the lenses have been approved or for which the manufacturer has recommended safe use has been exceeded.

For safety, health as well as other reasons, there is a need for technology that would serve to prevent individuals from wearing contact lenses beyond time periods designated for their replacement. An efficient compliance indicator may be preferably embedded in the contact lens itself and practically enforce its replacement. Such an indicator may be in the form of a discernible colored spot appearing at the periphery of the contact lens after the lapse of a specific period of time. A compliance indicator in accordance with the present invention preferably meets a number of conditions, including initial transparency and compatibility with contact lens technology and materials. Given the potential large variations in the ambient temperature while in storage or while being transported, the compliance indicator preferably responds to any suitable triggering mechanism, other than temperature, such as light.

In accordance with the present invention, the compliance indicator may comprise cholesteric liquid crystal material technologies that may be incorporated into and/or onto contact lenses in any number of suitable ways, including tampo printing, ink jet printing, embedded film, or any other technique for placing pigmentation in contact lenses. The reflective characteristics of the cholesteric liquid crystal materials depend on the period of the helical structure of the molecular orientation. The period of the structure may be altered by any one, or a combination of several, external stimuli. For example, these materials are responsive to visible light and changes may be accomplished in seconds, minutes, or hours depending on the timeframe desired. Essentially, the materials may be designed and constructed so that the reflectance of the material is initially formed in either the ultraviolet region or the infrared region of the electromagnetic spectrum, both of which are invisible to the human eye. Exposure to visible light causes the period to change so that the peak reflectance shifts over time to the visible spectrum, producing a colored appearance clearly visible to the human eye. When it is visible, the contact lenses are simply discarded or cleaned.

The liquid crystal material of the compliance indicator may be engineered to be utilized in a contact lens such that the lens is clear fresh out of the package, but after a pre-determined period of time of exposure to visible light, depending on the prescribed wear-schedule, a visible patch of color, for example, a red ring appears to indicate that the contact lens has been utilized for the prescribed period of time. The color change may be either reversible or permanent. It is important to note that exposure to light is but one of a number of possible stimulus factors that may cause the desired change. For example, the accumulation of impurities may also be a change stimulus.

The compliance indicator of the present invention provides a simple and inexpensive way for a user to achieve compliance with manufacturers recommended wear time. This compliance ensures the safety, health and comfort of the wearer.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then discarded, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Contact lenses from all manufacturers have set time periods, determined by the manufacturer, as to when the contact lenses should preferably be replaced. This period varies based upon a number of factors, including the type of material from which the lens is formed, the duration of time the contact lenses are worn, the cleaning regimen utilized for the contact lenses as well as a number of other factors. For health, safety and comfort, contact lens wearers should follow the manufacturer's suggested time guidelines. However, adherence to the guidelines may be problematic for any number of reasons. For example, busy adults with active lifestyles may simply forget when they started with new lenses thereby making it very difficult to determine when to replace them and thus simply wear them too long. Young adults may not even try to remember when their contact lenses should be replaced. Young children may not be aware of the care for their lenses and their parent may also forget. For all of these reasons and more, the present invention is directed to a compliance indicator that provides some form of indication as to when it is appropriate to replace a pair of contact lenses. Contact lenses are also designed to be thin and flexible. This thinness and flexibility makes the contact lenses comfortable to wear, but also prone to inversion. In other words, it is very easy for a contact lens to become inverted or inside-out during handling and cleaning. As any wearer knows, contact lenses that are positioned on eye in an inverted state do not provide optimal vision correction and/or comfort. Therefore, in accordance with another aspect, the present invention is directed to inversion markings that are clearly visible to a wearer of contact lenses. Both the compliance indicator and the inversion marking of the present invention may be fabricated with liquid crystal materials that are engineered for specific purposes. As set forth below, both inversion markings and compliance indicators utilizing liquid crystal technology in accordance with the present invention are described in detail.

Contact lenses need to be thin and flexible for comfort. Such flexibility may result in contact lens inversion upon handling. Accordingly, there is a need for marking the contact lenses with some form of indicia such that their normal or non-inverted state may be easily distinguished from the inverted state. In order not to affect the aesthetic and optical properties of the contact lens, the inversion marking is presently made in the form of a small number series at the periphery of each contact lens. This makes the marking barely visible, thus requiring special effort and/or adequate illumination to locate and identify the marks. An inversion marking in accordance with the present invention that is highly visible and easily identifiable when the contact lens is out or off of the eye but is invisible on the eye is highly desirable.

In the present invention such functionality may be achieved by utilizing the phase transition phenomena exhibited in liquid crystal materials. The liquid crystal state is a distinct phase of matter observed between the solid or crystalline state and the liquid or isotropic state. There is the nematic phase which is characterized by molecules that have no positional order, but tend to point in the same direction, the smectic phase in which the molecules demonstrate a degree of transitional order, the cholesteric or chiral nematic phase wherein there is alignment with respect to the molecules, but at a slight angle with respect to one another, and the columnar phase which is characterized by stacked columns of molecules. Particularly, nematic-isotropic or cholesteric-isotropic phase transition processes are employed to induce transformations between diffuse light scattering and transparent states in the case of nematic liquid crystal materials, and transformations from reflective to transparent states is the case of cholesteric liquid crystal materials. Utilizing liquid crystal materials in contact lenses for the purpose of creating markings offers a number of advantages, including very thin liquid crystal material layers may be utilized to obtain high contrast, the phase transition temperature of liquid crystal materials may be easily adjustable to match corneal temperature, liquid crystal materials provide a wide versatility of high contrast states, and liquid crystal materials are relatively inexpensive.

Figure 1A:
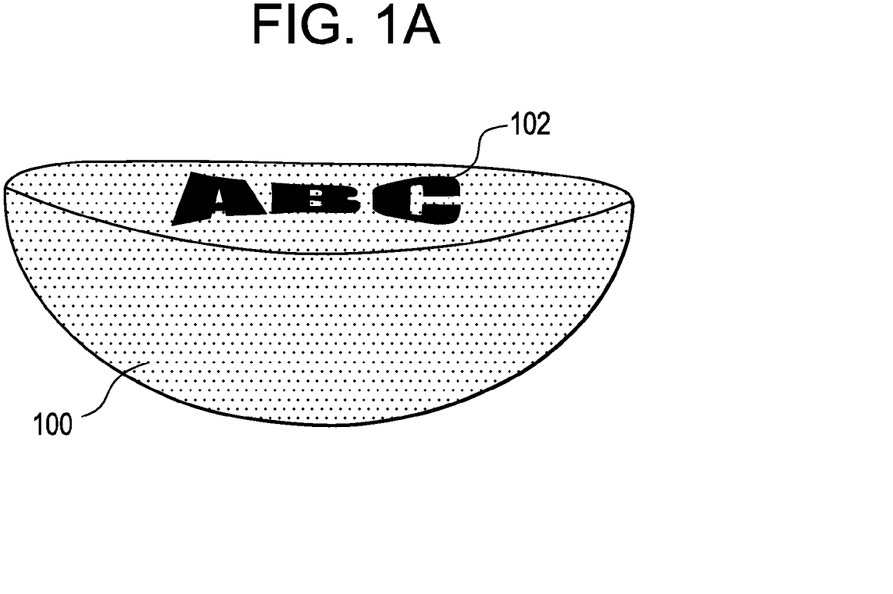
FIG. 1A is a diagrammatic representation of a contact lens incorporating an exemplary inversion marking that is visible.
Figure 1B:
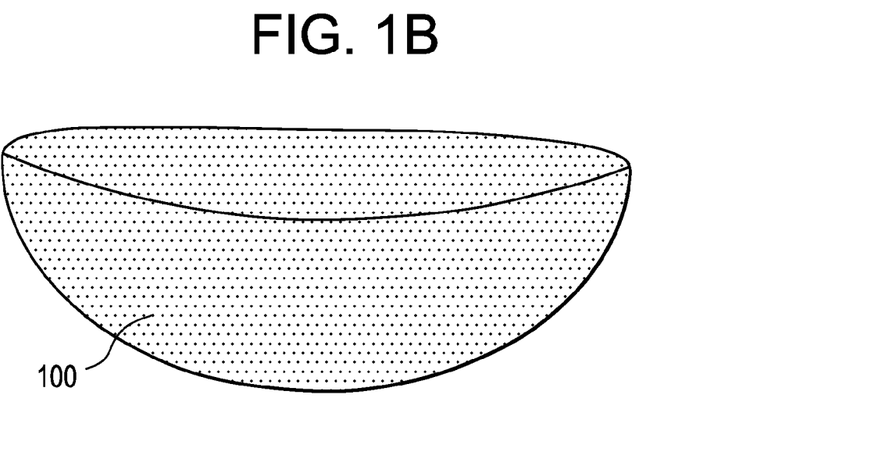
FIG. 1B is a diagrammatic representation of the contact lens of FIG. 1A with the exemplary inversion marking not visible.

FIG. 1A illustrates a contact lens 100 comprising an inversion marking 102 incorporated into a peripheral portion of the contact lens 100. In this exemplary embodiment, the inversion marking 102 simply comprises the letters A, B and C, which would only be visible off the eye, for example, when on the wearer's fingertip or palm. If the letters of the inversion marking 102 appear as illustrated, the contact lens 100 is not inverted and may be placed on the eye. FIG. 1B illustrates the contact lens 100 as it would appear on eye. In other words, the inversion marking 102 (FIG. 1A) is no longer visible.

Figure 2A:
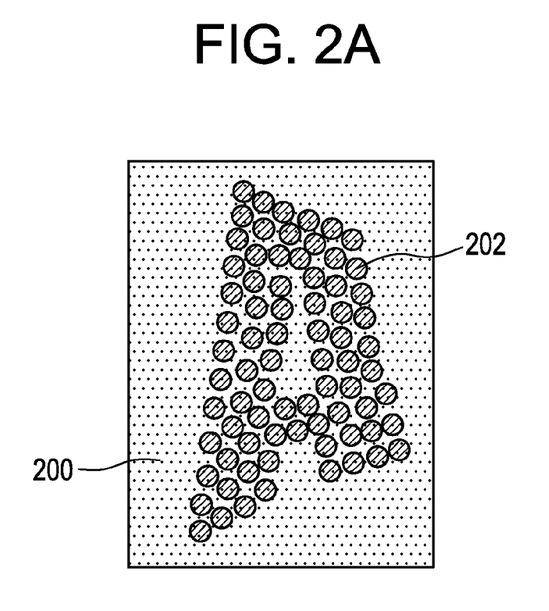
FIG. 2A is a diagrammatic representation of the structure of an exemplary inversion marking comprising liquid crystal droplets in a visible state in a polymer matrix.
Figure 2B:
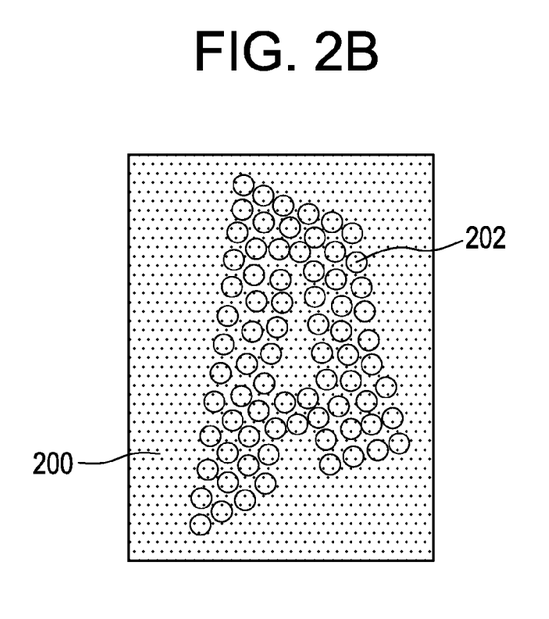
FIG. 2B is a diagrammatic representation of the structure of the exemplary inversion marking of FIG. 2A with the liquid crystal droplets in an isotropic state matching the refractive index of the polymeric matrix making the inversion marking invisible.

In accordance with the present invention, the exemplary inversion marking 102, illustrated in FIG. 1A, comprises a layer of polymer dispersed liquid crystal (PDLC) in the form of ABC; however, any suitable pattern or indicia may be utilized so long as a contact lens wearer would recognize the pattern as indicating whether the contact lens 100 is not inverted or inverted. As utilized herein, the form of ABC, or any other indicia, as set forth above shall be construed to mean either that the polymer dispersed liquid crystal and/or any suitable material is physically shaped into an ABC or printed on a material as an ABC. Polymer dispersed liquid crystal materials include liquid crystal micro droplets 202 encapsulated in a polymer matrix as illustrated in FIGS. 2A and 2B to form inversion marking 200. The liquid crystal micro droplets 202 may be arranged to dorm any symbol. In this exemplary embodiment, a thin film on the order of about ten (10) μm in thickness, has two distinct optical states as illustrated in FIG. 2A; namely, strong light scattering which shows a visible letter A with an extinction constant (an extinction constant or the molar extinction coefficient is a measurement of how strongly a material absorbs or scatters light at a given wavelength range) on the order of 1000 $cm^{-1}$ or higher, and transparent with no appreciable attenuation of light propagating therethrough as illustrated in FIG. 2B which shows an invisible letter A. The strong diffuse light scattering is caused by the random orientation of the optical axis of the liquid crystal material in different droplets, the mismatch between the refractive index of the polymer and the liquid crystal material droplets, and/or both.

Figure 3:
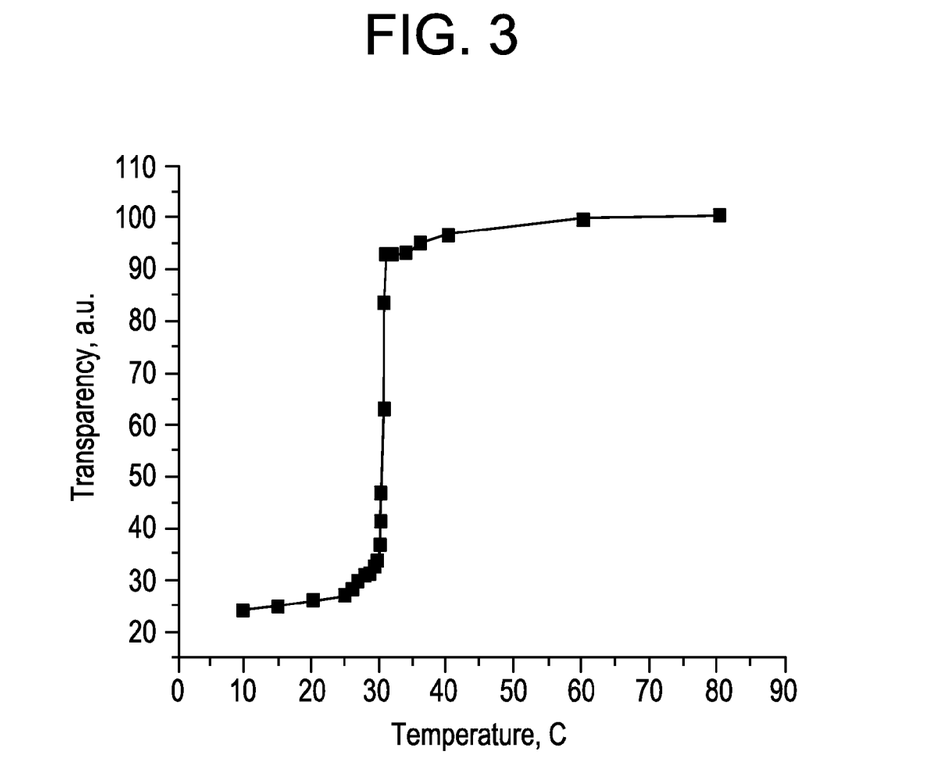
FIG. 3 is a graphical representation of the change in the optical state of a polymer dispersed liquid crystal film as a function of temperature.

FIG. 3 graphically illustrates the exemplary change in the optical state of a polymer dispersed liquid crystal film as a function of temperature. More specifically, FIG. 3 illustrates the change in the optical state of the polymer dispersed liquid crystal film from low transmissive/high light scattering to transparent state as the temperature is increased to near corneal temperature. Essentially, heating the liquid crystal droplets in the polymer matrix to their isotropic state transforms the material into an optically homogenous transparent state, as demonstrated in FIG. 3, if the effective refractive index of the liquid crystal material in the isotropic state matches the refractive index of the polymer.

There are a number of different technologies/methodologies for obtaining polymer dispersed liquid crystal materials thereby providing latitude for incorporating these materials into different contact lens production systems. In accordance with one exemplary embodiment, polymerization-induced phase separation (PIPS) may be utilized to obtain the polymer dispersed liquid crystal material. Polymerization-induced phase separation occurs when a liquid crystal is mixed with a material, for example, a pre-polymer, that has not yet undergone polymerization. Once a homogenous solution is formed, the polymerization reaction is initiated. As the reaction progresses, the liquid crystal molecules start to form droplets. The droplets continue to grow until the polymer binder becomes solid enough that the molecules are trapped and can no longer move. A number of factors influence the size of the liquid crystal droplets in polymerization-induced phase separation, including the curing temperature, which affects the speed of the polymerization as well as the diffusion rate and solubility of the liquid crystal in the polymer, the intensity of the curing light, and the chemical composition of the material utilized. Essentially, these factors can greatly influence the size of the liquid crystal droplets which in turn affects the diffuse light-scattering features of the polymer dispersed liquid crystal.

An exemplary polymerization-induced phase separation process utilized in accordance with the present invention may be described in a number of steps as follows. In a first step, a mixture of forty-five (45) weight percent of nematic liquid crystal E-7 or E7 (manufactured and sold by Merck, Poole, U.K.) and fifty-five (55) weight percent of fresh NOA-65 prepolymer is prepared. Norland Optical Adhesive 65 or NOA-65 is a clear, colorless photopolymer curable by ultraviolet light. In a second step, the mixture is continuously and thoroughly mixed until it becomes optically uniform. In a third step, a cell is filled with the optically uniform mixture and exposed to a UV lamp with a three hundred sixty-five (365) nm wavelength and approximately 10 $mW/cm^2$ light intensity for a period of between thirty (30) seconds and one (1) minute assuming photo polymerization was employed. Polymerization may be performed thermally or by any other suitable method as well. Alternately, polymer dispersed liquid crystal materials may be obtained by solvent evaporation from a mixture of a liquid crystal and a polymer. After curing and cooling down or after solvent evaporation, the samples appear opaque indicating that phase separation has occurred. The polymer may then be peeled off as a free-standing film. In an alternate exemplary embodiment, the mixture may comprise seventy (70) weight percent 5CB and thirty (30) weight percent prepolymer. 5CB or 4-cyano-4'-pentylbiphenyl is another nematic liquid crystal material.

It is important to note that while the wavelength, light intensity and period are specifically set forth for the above described exemplary process, the wavelength, light intensity and the period may be varied for different processes and to achieve different results.

The optical and thermodynamic properties of polymer dispersed liquid crystal materials, including diffusivity, clearing temperature and contrast, may be optimized to meet the goals of a specific application by varying the material parameters, thickness and polymerization conditions. The material parameters comprise the type of the polymer, the liquid crystal material and their ratio in the mixture. Thin films of polymer dispersed liquid crystal materials may be characterized by a clearing temperature higher than standard room temperature and equal to or less than corneal temperature. It is important to note that the optical transmission state of polymer dispersed liquid crystal materials can switch sharply when the temperature changes by less than one (1) degree C. as shown in FIG. 3. Even if the temperature rises smoothly, the change in optical transmission can be very fast, for example, in the millisecond to second range. This feature results from the exponential dependence of optical transmission on the extinction coefficient of the material.

Figure 4:
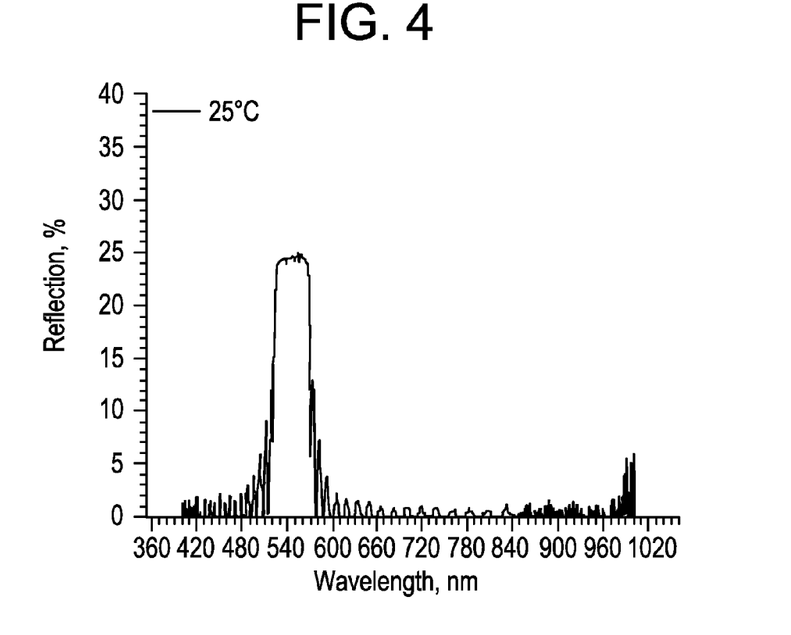
FIG. 4 is a graphical representation of the reflection spectrum of an exemplary cholesteric liquid crystal material for use as an inversion marking in a contact lens centered at green wavelengths.

In an alternate exemplary embodiment of the present invention, the inversion marking of a contact lens may comprise a cholesteric liquid crystal material with a reflection bandgap in the visible range of wavelengths as illustrated in FIG. 4. FIG. 4 shows the reflection spectrum of a cholesteric liquid crystal material which may be utilized as an inversion marking centered at green wavelengths. The cholesteric liquid crystal material can lose its reflection upon heating to a temperature close to the temperature of the cornea due to the reflection bandgap shift to a wavelength range above eight hundred (800) nm or below four hundred (400) nm, which is invisible to the human eye. Since the sensitivity of the eye is higher at green wavelengths as compared to blue and red, the initial, low-temperature green color is preferable for the purposes of the intended application; namely, an inversion marking.

Figure 5:
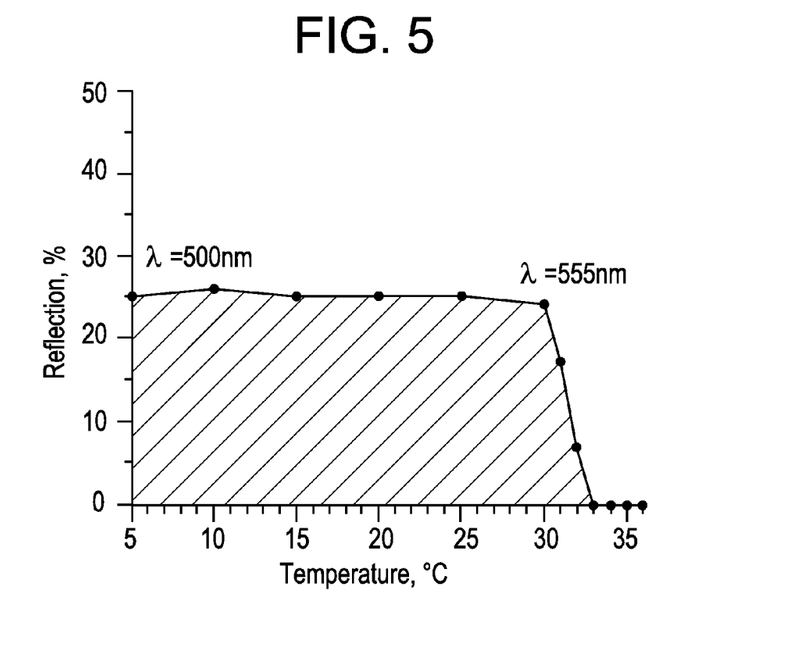
FIG. 5 is a graphical representation of the change in reflection of an exemplary cholesteric liquid crystal material for use as an inversion marking in a contact lens from a reflective state to a transparent state as the temperature increases to near cornea temperature values.

In yet another alternate exemplary embodiment of the present invention, the inversion marking of a contact lens may comprise a cholesteric liquid crystal material that loses its reflection upon heating it to a temperature close to temperature of the cornea due to phase transition of the cholesteric liquid crystal into an isotropic state. The cholesteric liquid crystal mixtures designed for such functionality may be based on these major components; namely, the nematic liquid crystal host, the chiral agent to induce cholesteric liquid crystal structure with visible reflection, and a compound to adjust the clearing temperature to a value near the temperature of the cornea. The cholesteric liquid crystal material properties are preferably chosen or selected such that the material does not exhibit appreciable color change as temperature values below the corneal temperature, but becomes very sensitive and undergoes colored to colorless transition for a small change of temperature near the corneal temperature as illustrated in FIG. 5. FIG. 5 shows the change in the reflection of a cholesteric liquid crystal material utilized for an inversion marking from a reflective state with a five hundred (500) nm Bragg wavelength to a transparent state when the temperature is increased to near cornea temperature values.

In still yet another alternate exemplary embodiment of the present invention, two layers of cholesteric liquid crystal materials of different pitches and resulting reflected colors, for example, red and blue, may be integrated into a lens so that the layer of one pitch is nearest the lens inner surface and the second pitch layer is nearest the lens outer surface so the surfaces are viewed as having different colors. It is important to note that in alternate exemplary embodiments, the cholesteric liquid crystal materials may be on the surfaces of the lens. Color crosstalk between the two pitch layers is prevented by the use of a similarly thin and temperature responsive polymer dispersed liquid crystal material diffuse spacer placed between the two pitch layers. Individual cholesteric liquid crystal layers in this system may be between three (3) to five (5) μm thick to exhibit reflection of spectral components in ambient un-polarized light within the cholesteric liquid crystal reflection band gap with efficiency providing comfortably readable contrast, preferably in the range from about ten (10) to about fifty (50) percent. The polymer dispersed liquid crystal spacer film may be less than ten (10) μm in thickness.

Figure 6:
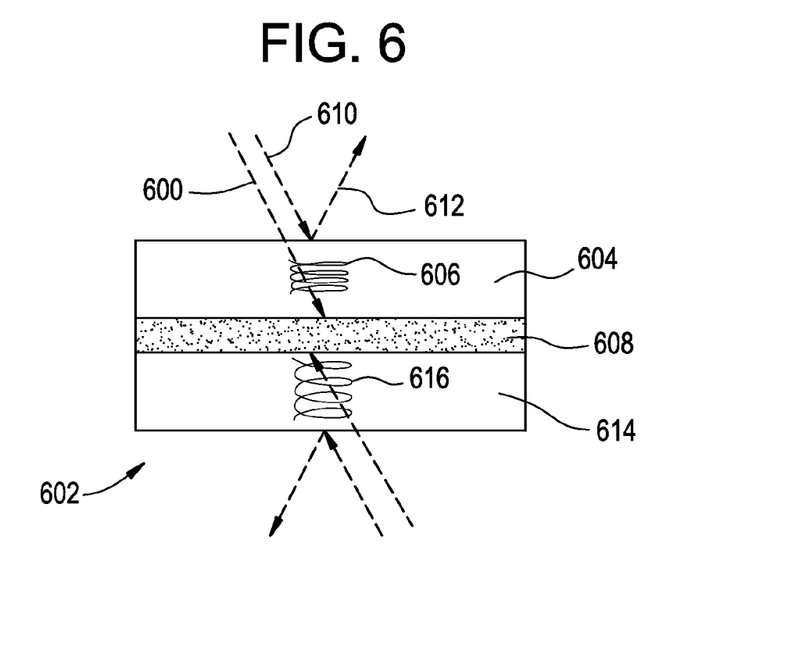
FIG. 6 is a diagrammatic representation of a block of marker material comprising two different cholesteric liquid crystal layers.

Referring now to FIG. 6, there is illustrated a block or layer or marker material 602. More specifically, FIG. 6 illustrates the action of incident light 600 upon the marker material 602. Incident light 600 of a wavelength longer than the red edge of the cholesteric liquid crystal band gap propagates through the cholesteric liquid crystal layer 604 represented by spiral 606 of a short pitch and are blocked due to light scattering in the polymer dispersed liquid material spacer layer 608. The incident light 610 of a shorter wavelength is strongly reflected by the cholesteric liquid crystal layer 604. The reflected light is represented by vector or arrow 612. The second film or layer of cholesteric liquid crystal 614 has a longer pitch, represented by spiral 616, thereby reflecting light of longer wavelength and transmitting a shorter wavelength, the latter being blocked by the polymer dispersed liquid crystal material spacer layer 608. Accordingly, to an observer, light from cholesteric layer 604 would appear blue whereas light from cholesteric liquid layer 614 would appear red.

Figure 7:
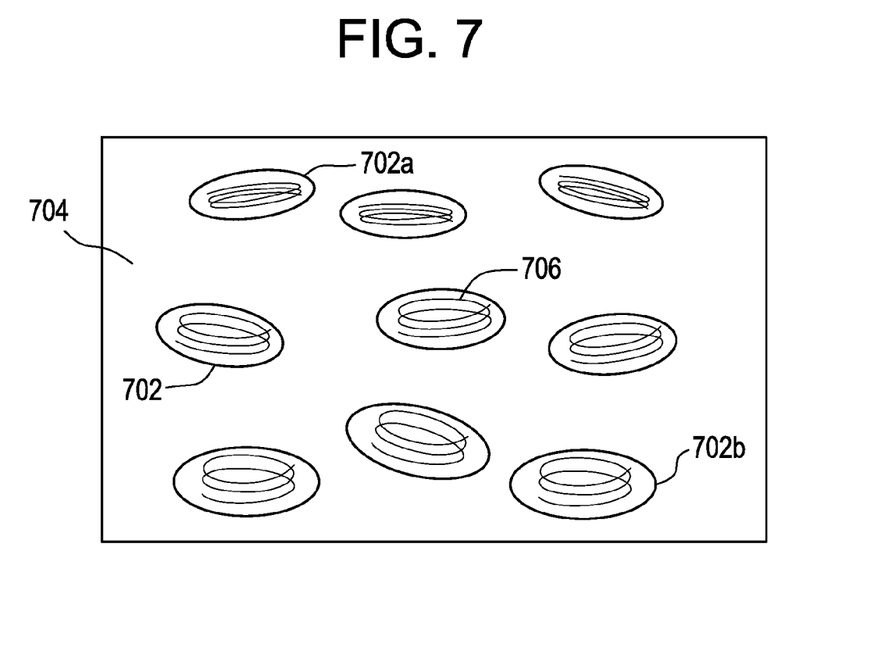
FIG. 7 is a diagrammatic representation of cholesteric liquid crystal droplets in a polymer dispersed liquid crystal material.

In accordance with a different aspect, cholesteric liquid crystal droplets may be incorporated into a single polymer matrix with the cholesteric liquid crystal pitch, and resulting reflected color, changing from the front to the back of the resulting film. FIG. 7 generically illustrates cholesteric liquid crystal droplets on a polymer dispersed liquid crystal material. The ovals 702 represent the cholesteric liquid crystal droplets in the polymer 704. Spirals 706 represent cholesteric liquid crystal of different pitch in the droplets 702. The color reflected is directly related to the pitch. The shorter or tighter the pitch, spiral 702a, the shorter the wavelength of reflected light, and the longer the pitch, spiral 702b, the longer the wavelength of reflected light. The front and the back of such a film show different coloration. Crosstalk between the different colors is prevented in such a film by diffuse light scattering at the cholesteric liquid crystal-polymer interfaces and random orientation of cholesteric liquid crystal axes in the droplets.

The pitch gradients may be obtained and stabilized, for example, with the aid of a polymer network or having chiral dopants in the composition of the cholesteric liquid crystal that irreversibly change their helical twisting power. Subjecting such a film to light, particularly UV light, results in a changing of the helical twisting power of the chiral dopants from the front to the back of the film due to light attenuation which is caused by absorption and scattering. The generation of color gradient film may accompany the photo polymerization process.

The temperature responsive materials described above may be patterned to show numbers, figures or signage that would facilitate identification of the normal orientation of the contact lens. Patterning may be realized using different processes. In a preferred exemplary embodiment, the patterning of a diffuse light scattering polymer dispersed liquid crystal material on a transparent, temperature insensitive background may be realized with UV light propagated through a mask and projected onto the mixture of a monomer and the liquid crystal material. The polymerization process performed at a low temperature such as fifteen (15) degrees C. for the liquid crystal material and polymer composition described above (5CB in NOA-65), under constant nitrogen flow to avoid water vapor condensation, results in forming polymer dispensed liquid crystal in the form of the desired pattern of strong light scattering. In a second step, the temperature of the cell holding the mixture is increased to above twenty-five (25) degrees C., for example, the mask is removed, and the whole sample is subject to the UV light. Thus, all the material that was not subject to light at the first step gets polymerized as a transparent polymer film that remains transparent after cooling independent of ambient temperature. Alternately, as is practiced in photolithography, the unpolymerized portion of the material may be washed out leaving the temperature sensitive pattern intact. This polymer dispersed liquid crystal technology provides the advantage of easy and inexpensive manufacturing, and wide viewing angle due to diffuse light scattering. The cholesteric liquid crystal technology has the advantage of mirror-like reflection that may be visible even at low light conditions, and the feasibility of different colors.

Similar transitions between visible and invisible states may be obtained, as an example, due to the effect of ambient light on photoresponsive liquid crystalline materials. Unlike ambient light, however, the cornea provides a well controlled temperature environment with a mean value at 34.2 degrees C. for a normal person. This is over ten (10) degrees C. higher than room temperature where contact lenses are more likely to be inserted into eye making thermally responsive materials preferable in most situations. Temperature responsive materials are preferable also due to their speed as compared to processes taking place in ambient light.

The present invention is directed to a contact lens comprising an inversion marking layer having a mark that is visible when the lens is off of or out of the eye and becomes invisible when the lens is on the eye. The optical properties of the inversion masking layer, which may include color, light, scattering, light diffraction and light reflection, may be patterned, at least in parts, for easy and unambiguous identification of the normal and inverted states of the contact lens. It is important to note that any suitable pattern may be utilized and that the inversion marking layer, which is incorporated into the contact lens in any suitable location that does not interfere with the optics, may have different optical properties on opposite sides thereof. The transformation from a visible mark to an invisible mark may be induced via a number of factors or processes including by heat from the body to near cornea temperature, by ambient light, and changing humidity as when the contact lens is removed from a storage solution.

Although a number of examples of liquid crystal materials and polymers are set forth herein, it is important to note that any number of materials may be utilized. For example, the inversion marking film may comprise a polymer, a liquid crystal, a dye, a gel, a composite of polymers and liquid crystals in a form of polymer dispersed liquid crystals, a composite of polymers and liquid crystals in the form of polymer networked liquid crystals, a composite of polymers and liquid crystals in the form of polymer-liquid crystals-polymer sequences and composites comprising nanomaterials.

Additionally, certain optical properties of the material forming the inversion marking layer, including refractive index, absorption, optical anisotropy and orientation of optical axis, may be controlled or modulated to achieve various functionality/effects. For example, these properties may be modulated in the spatial scale of three hundred (300) nm to one thousand (1000) nm in any manner including periodically, randomly or any combination thereof. Molecular self-ordering processes as in cholesteric liquid crystals, phase separation processes as in polymer dispersed liquid crystals, optical recording processes as in holographic polymer dispersed liquid crystals, polymer-liquid crystal-polymer slices or polymerization gratings, as well as printing and lithography may be utilized in optical property modulation.

The change between visibility and invisibility of the inversion marking may be precipitated or caused by a number of processes and/or combination of processes, including decreasing the contrast of modulation of the optical properties of the inversion marking layer ultimately leading to an optically homogenous structure and changing of the spatial scale of the modulation of the optical properties of the inversion marking layer to shorter, typically below three hundred (300) nm, or larger wavelengths, typically even eight hundred (800) nm.

The inversion marking layer may comprise a thin film as set forth herein and also include one or more protective layers. The one or more protective layers may themselves be thin films. The inversion marking layer may also comprise functional materials, including photochromic materials and therapeutic agents.

Contact lenses need to be replaced after a given period of time. This period of time may vary from weeks to months. For most wearers of contact lenses, it is sometimes difficult to remember when the lenses should be replaced with a fresh pair. Accordingly, technology which may be tailored to various types of lenses and which indicates when the lenses should preferably be discarded would be beneficial to the wearer's safety, health and comfort. Therefore, in accordance with another exemplary embodiment, cholesteric liquid crystal materials may be introduced into contact lenses utilizing any suitable means and which act or may be configured as usage compliance indicators. A compliance indicator in accordance with the present invention may be preferably embedded in the contact in itself and practically enforce its replacement when required. A compliance indicator in accordance with the present invention preferably meets a number of conditions, including initial transparency and compatibility with contact lens technology and materials. The compliance indicator may be in the form of a discernible colored spot or marking appearing at some point or region of the contact lens, for example, the peripheral region, after the lapse of a specific period of time. In other words, when the contact lenses are removed from the packing, the lenses are clear; however, after a given period of time and exposure to external stimuli, such as visible light, a colored mark appears indicating to the wearer that it is time to replace the lenses. Essentially, the materials may be designed and constructed so that the reflectance of the material is initially found in either the ultraviolet region or the infrared region of the photonic spectrum, both of which are invisible to the human eye. Exposure to visible light, for example, causes the period to change so that the peak reflectance shifts over time to the visible region of the photonic spectrum, producing a colored appearance clearly visible to the human eye. When it is visible, the contact lenses are at or past the manufacturer's recommended usable time and are simply discarded.

Figure 8A:
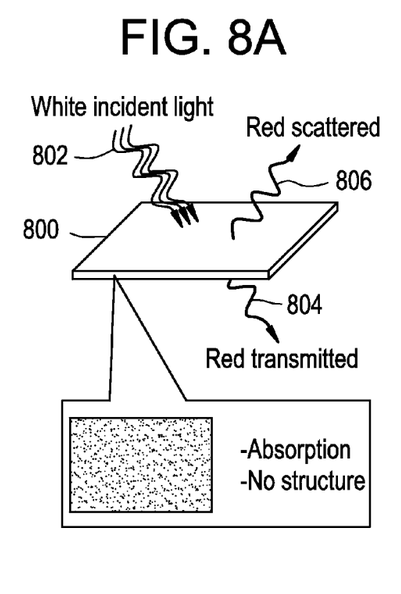
FIG. 8A is a diagrammatic representation of a material that absorbs radiation except for a given wavelength.
Figure 8B:
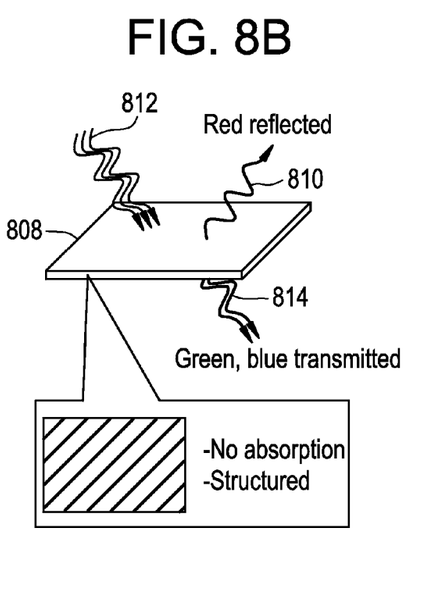
FIG. 8B is a diagrammatic representation of a layer of a photonic band gap material designed to reflect light of a given wavelength.

Color is typically obtained due to light absorption. A material such as red ink appears red because red ink absorbs all incident light with the exception of its spectral components in a relatively narrow spectrum centered at the red wavelength. Dyes and other materials which are colored due to molecular absorption do not allow much control opportunities for their color and do not possess a suitable colorless state. Referring to FIG. 8A, there is illustrated a layer of material 800 that absorbs radiation of all wavelengths from incident white light 802, except, as an example red light. Red transmitted light 804 is transmitted through this material 800 and also red scattered light 806 emanates from the surface of the material 800. In contrast, photonic band gap systems or materials are periodically structured dielectric media, an electromagnetic analog of atomic lattice, however, with the scale of periodically comparable to the wavelength of visible light. The bright colors of these materials are due to reflection and not absorption. Referring to FIG. 8B, there is illustrated a layer of a photonic band gap material 808. The material 808 has a periodic structure with spacing on the order of a visible wavelength (0.4-0.7 μm) and reflects red light 810 from incident white light 812 while transmitting all other wavelengths of light 814. It is interesting to note that colors due to photonic band gap structures may be found in nature such as on the scales of butterfly wings. Cholesteric liquid crystals, as described above, are photonic band gap systems.

Figure 9:
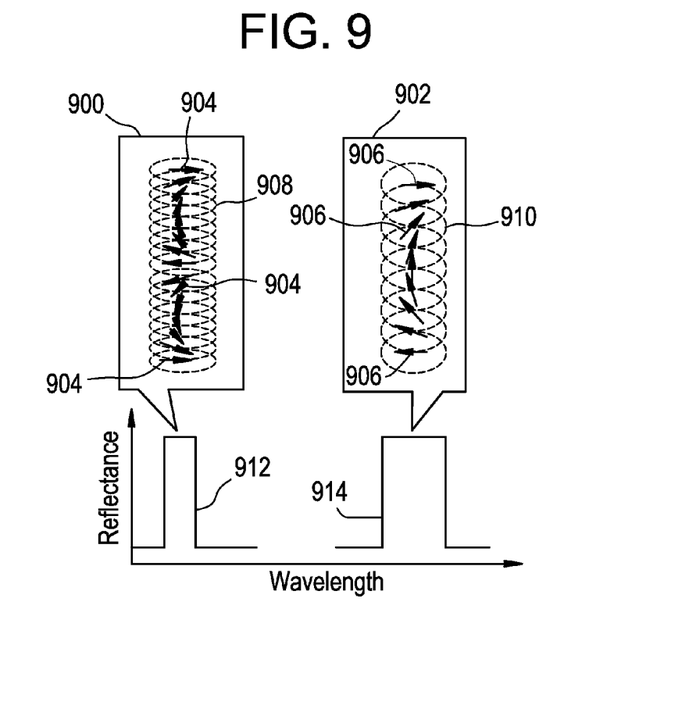
FIG. 9 illustrates the periodic structure of cholesteric liquid crystal materials.

Cholesteric liquid crystals, as described above, are photonic band gap systems. The photonic band gap structure of so-called cholesteric liquid crystals is illustrated in FIG. 9. The orientation of rod like molecules of cholesteric liquid crystal materials rotate in space between different layers forming a helix or helical structure. In other words, cholesteric liquid crystal materials 900 and 902 comprise elongated molecules that are oriented parallel to each other at each plane of the material 900 and 902. The direction of this orientation, indicated by arrows 904 and 906, rotates in space forming a spiral or helix 908 and 910. Cholesteric liquid crystal materials reflect the spectral component of light with wavelengths in the band gap centered around the value of the pitch of the helix 908 and 910. The pitch of the helix that determines periodicity and therefore the color of the light reflected from the cholesteric liquid crystal material is a result of a balance between intermolecular forces. All it takes to dramatically modify the cholesteric liquid crystal material color is a small change in its periodicity that may be easily achieved with the aid of one or more of a variety of external influences or stimuli, for example, visible light, that affect the balance of forces making up the helix. It is important to note that any form of stimuli may be utilized, including temperature, humidity and any wavelength of electromagnetic radiation. Cholesteric liquid crystal material 900 has a shorter pitch, represented by spiral or helix 908 and thus reflects light of shorter wavelength 912 and transmitting a longer wavelength, appearing blue to an observer viewing the reflected light while liquid crystal material 902 has a longer pitch, represented by spiral or helix 910 and thus reflects light of longer wavelength 914 and transmitting a shorter wavelength, appearing red to an observer viewing the reflected light.

Figure 10:
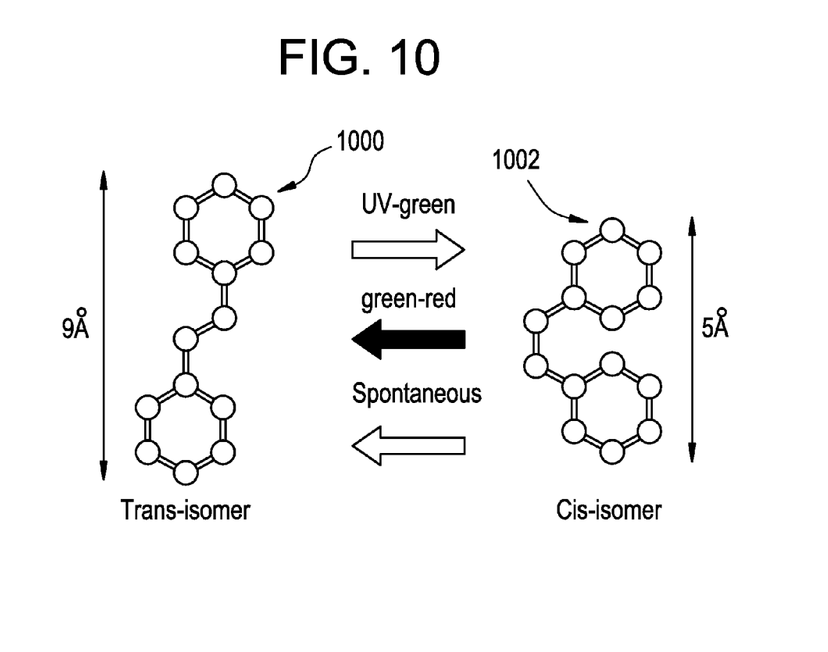
FIG. 10 illustrates the structure of the trans-isomer and cis-isomer forms of azobenzene.
Figure 11:
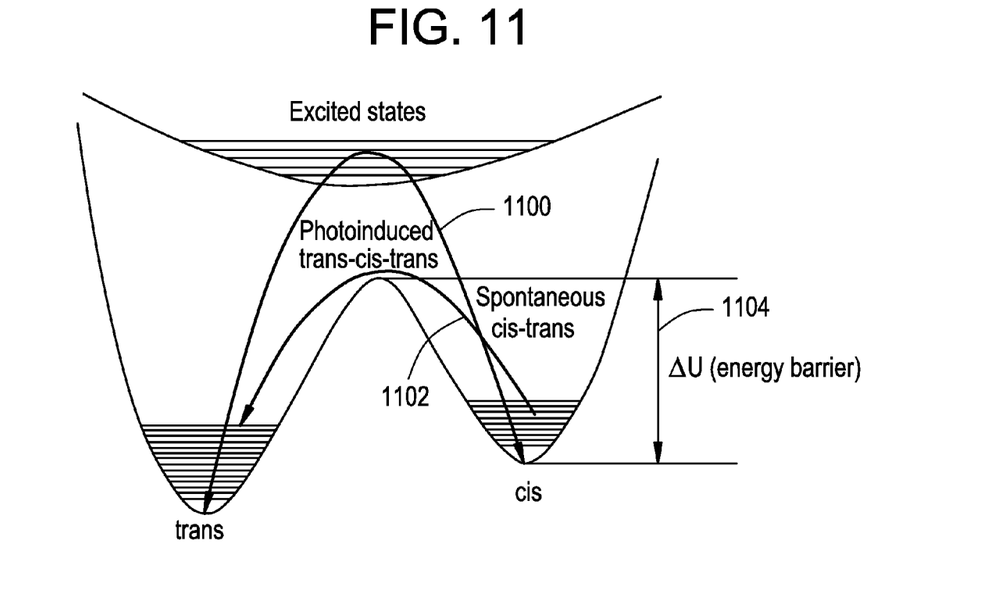
FIG. 11 is a schematic energy diagram of the azobenzene molecule.

In accordance with one exemplary embodiment, the cholesteric liquid crystal material comprises azobenzene moieties. However, it is important to note that any suitable material may be utilized that is comparable with the ultimate use. Azobenzene molecules exist as two isomers; namely, trans-isomer, which is thermodynamically stable, and cis-isomer, which is metastable. FIG. 10 illustrates the structure of the trans-isomer form 1000 and the structure of the cis-isomer form 1002. Transformation between the trans-isomer form and the cis-isomer form may be induced by light. Typically, ultraviolet light induces trans-cis photoisomerization, while light in the visible wavelength spectrum is capable of inducing cis-trans photoisomerization. The lifetime of cis-isomers may be varied from milliseconds to years by molecular engineering that affect the energy barrier between them as illustrated in FIG. 11. FIG. 11 is a schematic energy diagram of the azobenzene molecule which illustrates or demonstrates the process of photo induced trans-cis-trans isomerization, represented by two-way arrow 1100, and spontaneous cis-trans insomerization, represented by one-way arrow 1102. The energy barrier, $\Delta U$, 1104 between the trans-isomer and cis-isomer states determines the rate of spontaneous cis-trans photoisomerization. These two states of the azobenzene molecule are rather different with respect to their electrodynamic and thermodynamic properties. Therefore, isomerization does have a profound effect on the properties of the host material, which may possess a photonic band gap structure of cholesteric liquid crystal materials.

Figure 12A:
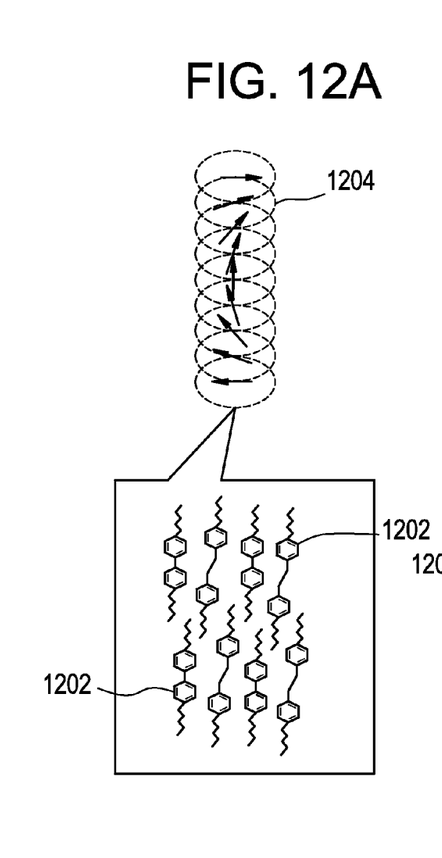
FIGS. 12A and 12B diagrammatically illustrate the effect of isomer content on cholesteric liquid crystal material pitch.
Figure 12B:
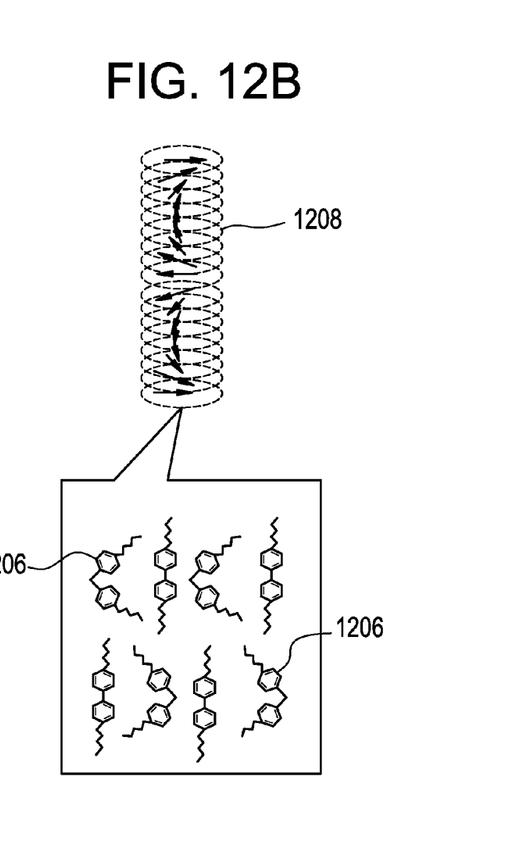

The pitch of the cholesteric liquid crystal helix may be varied in a large spectral range, including ultraviolet, visible and infrared wavelengths, by incorporating molecules containing azobenzene groups in their structure. Photoisomerization of azobenzene molecules affects the molecular order, thereby resulting in the change of the pitch of the helical structure of the cholesteric liquid crystal materials, as illustrated in FIGS. 12A and 12B. As set forth above, the pitch determines the reflection color; therefore, the effect of isomer content ultimately determines the reflection color. As illustrated in FIG. 12A, all isomers 1202 are in the trans-isomer state resulting in a longer pitch helix 1204, which in turn reflects a longer wavelength light. In FIG. 12B, part of the isomers 1206 are in the cis-isomer state (folded) and thus produce a shorter pitch helix 1208, which in turn reflects a shorter wavelength light. It is important to note that other suitable materials exhibiting similar properties to azobenzine may be added to the cholesteric liquid crystal material.

The particular color of the material is obtained as a result of exposure of the cholesteric liquid crystal material to an ultraviolet light during a certain time period. The color may be changed throughout the visible spectrum, depending on the ultraviolet light exposure time. The states with different colors may be stable for various time periods depending on the materials utilized. As described herein, this time period may range from or may be varied from milliseconds to years by the structural modification of the material. The original color of the cholesteric liquid crystal material is restored after expiration of its time period. These materials may be modified to switch the color completely off (invisible) upon exposure to ultra violet light, for example. The color then appears again after a predetermined time period controlled by material properties and light exposure conditions (visible). The process of color re-emergence may be fast as compared to the lifetime of the colorless state.

Figure 13:
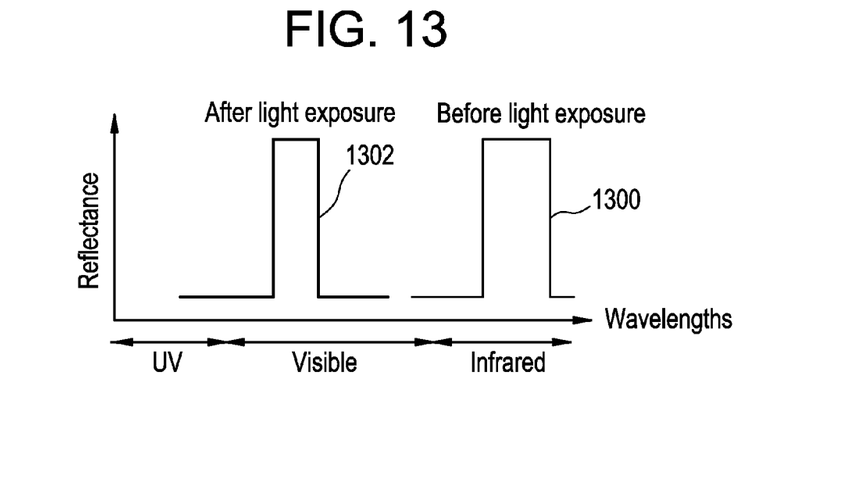
FIG. 13 illustrates the reflection spectra of a cholesteric liquid crystal material before and after exposure to light.

It is important to note that cholesteric liquid crystal material systems may be developed that undergo various color shifts, for example blue and red shifts, of their reflection band gap when exposed to ultraviolet and/or visible light. Referring to FIG. 13, there is illustrated the reflection spectra of a cholesteric liquid crystal material before and after exposure to light. The cholesteric liquid crystal material is initially colorless due to the circumstance that its reflection band gap 1300 is in the infrared portion of the electromagnetic spectrum. Exposure to radiation resulting in trans-cis isomerization of chiral dopant molecules, for example, azobenzene, makes the cholesteric liquid crystal material reflective in the visible spectrum due to the red-shift of the band gap 1302. Similarly, the cholesteric liquid crystal material may initially be in the ultraviolet reflective state and be transformed into the visible state due to the red-shift of the band gap caused by photoisomerization. The kinetics of isomerization, photosensitivity and the magnitude of the band gap shift are parameters which are preferably controlled to achieve the desired results. All of these parameters are essentially controlled by the use of one or more dopants. In one exemplary embodiment, the one or more dopants may comprise azobenzene moieties, which may include a trans-isomer and a cis-isomer form.

Figure 14:
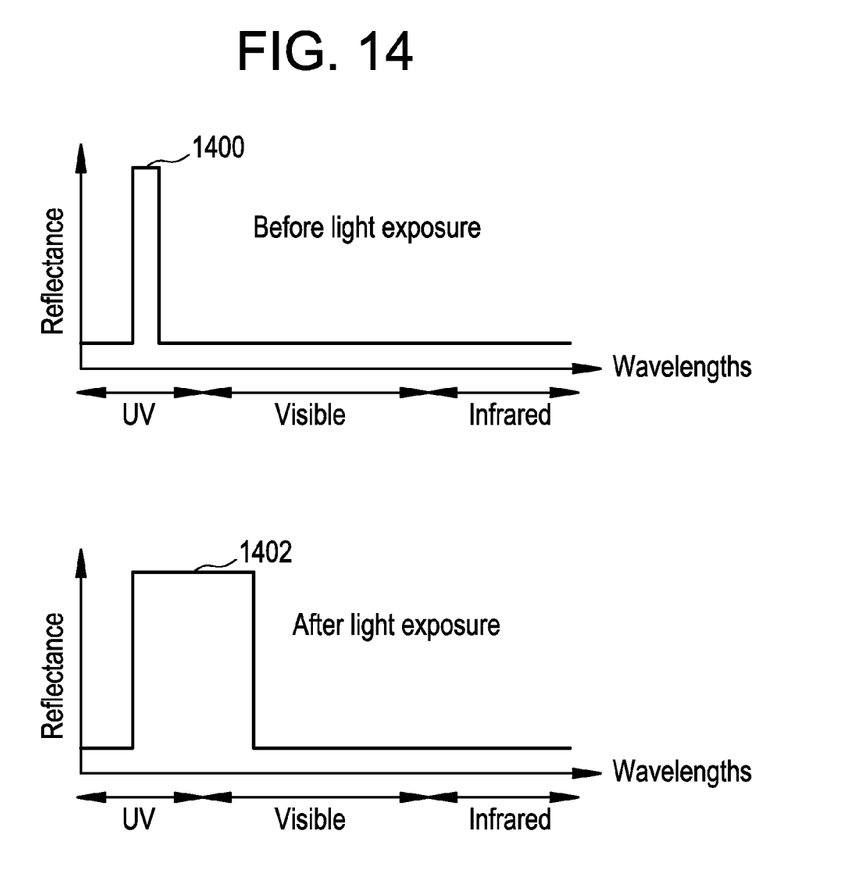
FIG. 14 illustrates the widening of a cholesteric liquid crystal material reflection band gap as a result of spatially inhomogeneous cholesteric liquid crystal pitch variation caused by spatially inhomogeneous distribution of photoinitiated cis-isomers.

The width of the cholesteric liquid crystal material band gap is determined by the optical anisotropy of the material and the periodicity of the material, i.e. the pitch of the cholesteric liquid crystal helix. Pitch gradients lead to a widening of the band gap. In a strongly ultraviolet absorptive material, cis-isomers are generated only at the front surface of the material, thereby creating large gradients of cis-isomer concentration, and consequently, cholesteric liquid crystal pitch. Thus a cholesteric liquid crystal material with a reflection band gap 1400 in the invisible part of the electromagnetic spectrum will become reflective for visible light as soon as the width of its band gap 1402 extends to visible wavelengths as illustrated in FIG. 14. This process provides an additional control over the kinetics of the process; namely, the diffusion of cis-isomers, which may be realized by incorporating a polymer network into the system.

In accordance with another exemplary embodiment, optically activated command layers may be utilized to create frustrated cholesteric liquid crystal structures. In this exemplary embodiment, a single molecular command layer may be sufficient to substantially affect the cholesteric liquid crystal structure. The command layer comprises azobenzene molecules that are attached to a surface and change orienting conditions for a liquid crystal material when subjected to light. In this manner, the command layer will preferably wind or unwind a cholesteric liquid crystal, while there may be no appreciable change in color with this configuration, the boundary between two cholesteric liquid crystal domains is highly visible and may be utilized as a usage compliance indicator.

The compliance indicator of the present invention may comprise a number of cholesteric liquid crystal materials as set forth above and may be incorporated into an ophthalmic lens such as a contact lens in any suitable manner as described above, including stamp printing, ink jet printing, embedded film, or any other technique for incorporating a pigmentation material into a contact lens. In one exemplary embodiment, the material comprising the compliance indicator is embedded in polymer structures adapted for use in a specific lens. In this embodiment, a narrow droplet of the polymer structure with the material may be injected into a particular section of the lens, for example, the peripheral portion of a contact lens rather than the optic portion of the lens.

The exemplary usage compliance indicators of the present invention may be realized in a number of different embodiments. For example, in one exemplary embodiment, the usage compliance indicator may be resettable or reversible, while in another exemplary embodiment, the unsafe compliance indicator may be irreversible. In other words, after the usage compliance indicator turns from invisible to a particular color, the wearer may want or need to continue to wear the contact lenses for an additional period of time. Accordingly, by the use of ultra violet light or complete darkness, the liquid crystal material of the usage compliance indicator may be reset, thereby allowing the wearer to temporarily continue to utilize the lenses. It may also be reset multiple times. Alternately, the liquid crystal material may be designed such that once it changes state, it cannot be changed back. In other exemplary embodiments, the color change may be a slow progression to a deep and/or rich color or an abrupt change. For example, if the time period for lens change is two weeks, then the change may start immediately upon exposure to visible light or alternately, there may be no color change for fourteen (14) days and on the fifteenth (15) day, there may be a complete color change or transition from invisible to visible. It is important to note that in the inversion marking embodiments, the markings are programmed to disappear quickly via temperature while in the usage compliance indicator embodiments, the change may be varied to create different impacts. In still other exemplary embodiments, the compliance indicator may be positioned in the periphery of the lens so as not to interfere with the optics, or it may be designed to interfere with the optics in some manner as to force the wearer to change lenses. This may be varied depending on the user. For example, for a very young child, a clearly visible marking may be necessary so that the parent or other caregiver makes no mistake as to when to change lenses. In preferred embodiments, the contact lenses should always provide vision correction regardless of whether or not use is in the compliance window.

It is important to note that while the present invention has been described with respect to contact lenses, the material may be utilized in any other type of lens or an optical window. The material of the compliance indicator may be utilized with any device where compliance is required or desired. Also, alternate band gap or reflective materials other than liquid crystal materials, such as block copolymers, that change color from exposure to an external stimulus may be utilized in accordance with the present invention. It is also important to note that exposure to light is but one of a number of possible stimulus factors that may cause the desired color change. With respect to contact lenses in particular, the accumulation of impurities may also serve as an external stimulus as they tend to build up over a fairly predictable time period. Finally, the inversion markings and the compliance indicators described and set forth herein may be incorporated into a lens as part of the same structure or as separate structures.

The duration of time or time period over which the compliance indicator changes from invisible to visible varies with the product in which it is utilized. In general, the time period corresponds to the useful life period of the lens or other device. This useful life period may be, but not necessarily, set or suggested by the manufacturer of the product.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic lens comprising:
   a contact lens formed from a first material and having at least an optic zone and a peripheral zone, the contact lens having a useful life period; and
   a usage compliance indicator embedded in the contact lens, the usage compliance indicator comprising a material that is changeable between an invisible state and a visible state over a predetermined period of time when subjected to an external stimulus, the material comprises a photonic band gap material, the photonic band gap material comprises a cholesteric liquid crystal material having a predetermined period of molecular orientation and one or more dopants, wherein the predetermined period of time being equal to the useful life period of the contact lens.

2. The ophthalmic lens according to claim 1, wherein the usage compliance indicator is embedded in at least a portion of the peripheral zone of the contact lens.

3. The ophthalmic lens according to claim 1, wherein the useful life period of the contact lens specified by the manufacturer may be in the range from days to months.

4. The ophthalmic lens according to claim 1, wherein the one or more dopants comprise azobenzene moieties.

5. The ophthalmic lens according to claim 4, wherein the azobenzene moieties include a trans-isomer form and a cis-isomer form.

6. The ophthalmic lens according to claim 5, wherein the trans-isomer form and the cis-isomer form of the azobenzene moieties undergo isisomerization from the external stimulus.

7. The ophthalmic lens according to claim 6, wherein the external stimulus comprises visible light.

8. The ophthalmic lens according to claim 7, wherein the light comprises ambient light.

9. The ophthalmic lens according to claim 8, wherein the azobenzene moieties undergo photoisomerization when exposed to ambient light, thereby altering the predetermined molecular period of the cholesteric liquid crystal material.

10. The ophthalmic lens according to claim 9, wherein the material is incorporated into a polymeric structure.

11. An ophthalmic lens comprising:
    a contact lens formed from a first material and having at least an optic zone and a peripheral zone, the contact lens having a useful life period; and
    a usage compliance indicator comprising a material that is changeable between an invisible state and a visible state over a predetermined period of time when subjected to an external stimulus and wherein the material comprises a cholesteric liquid crystal material having a predetermined molecular orientation and a command layer, the command layer comprises azobenzene moieties configured to change the predetermined molecular orientation of the cholesteric liquid crystal material when subjected to the external stimulus, the predetermined period of time being equal to the useful life period of the contact lens.

* * * * *